(12) United States Patent
Landerer

(10) Patent No.: US 12,438,229 B2
(45) Date of Patent: Oct. 7, 2025

(54) AIR DISPLACER, TRACTION BATTERY, PRODUCTION METHOD AND MOTOR VEHICLE

(71) Applicant: Bayerische Motoren Werke Aktiengesellschaft, Munich (DE)

(72) Inventor: Florian Landerer, Grafing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 576 days.

(21) Appl. No.: 17/785,106

(22) PCT Filed: Jan. 25, 2021

(86) PCT No.: PCT/EP2021/051563
§ 371 (c)(1),
(2) Date: Jun. 14, 2022

(87) PCT Pub. No.: WO2021/164984
PCT Pub. Date: Aug. 26, 2021

(65) Prior Publication Data
US 2023/0014625 A1 Jan. 19, 2023

(30) Foreign Application Priority Data

Feb. 20, 2020 (DE) .................... 10 2020 104 501.8

(51) Int. Cl.
*H01M 50/383* (2021.01)
*H01M 50/204* (2021.01)
*H01M 50/249* (2021.01)

(52) U.S. Cl.
CPC ....... *H01M 50/383* (2021.01); *H01M 50/204* (2021.01); *H01M 50/249* (2021.01); *H01M 2200/00* (2013.01); *H01M 2220/20* (2013.01)

(58) Field of Classification Search
None
See application file for complete search history.

(56) References Cited

U.S. PATENT DOCUMENTS 4,620,633 A * 11/1986 Lookholder ........... B65D 81/03
53/472
4,751,155 A 6/1988 Binder et al.
(Continued)

FOREIGN PATENT DOCUMENTS

DE 41 13 006 C1 4/1992
DE 10 2011 103 970 A1 3/2012
(Continued)

OTHER PUBLICATIONS

International Search Report (PCT/ISA/210) issued in PCT Application No. PCT/EP2021/051563 dated May 20, 2021 with English translation (four (4) pages).
(Continued)

*Primary Examiner* — Ula C Ruddock
*Assistant Examiner* — Maria F Orozco
(74) *Attorney, Agent, or Firm* — Crowell & Moring LLP

(57) ABSTRACT

An air displacer for a traction battery of a motor vehicle is configured such that, in the installed state in a battery housing of the traction battery, it at least partially fills a free volume in the battery housing and thereby at least partially displaces air in the battery housing in the event of heat generation inside the housing. The air displacer includes a vacuum bag; a foam that can be expanded using air, which is arranged in the vacuum bag; and a manually opening air inlet point. The air displacer can be transferred from an initial state in which the vacuum bag is evacuated in the closed state of the air inlet point and the foam in the vacuum bag is compressed, into an end state provided for the installed state in which air flows through the vacuum bag by manually opening the air inlet point and the foam is thereby expanded.

7 Claims, 1 Drawing Sheet

(56) References Cited

U.S. PATENT DOCUMENTS

| | | |
|---|---|---|
| 5,272,018 A | 12/1993 | Schlichenmaier et al. |
| 5,352,545 A | 10/1994 | Furukawa et al. |
| 2014/0141307 A1 | 5/2014 | Christian et al. |
| 2015/0295208 A1* | 10/2015 | Schumann ............ H01M 10/48 429/61 |
| 2016/0099442 A1* | 4/2016 | Kanayama .............. B60R 16/04 264/321 |
| 2017/0352849 A1 | 12/2017 | Obrist et al. |

FOREIGN PATENT DOCUMENTS

| | | |
|---|---|---|
| DE | 10 2013 223 085 A1 | 5/2014 |
| DE | 10 2014 206 813 A1 | 10/2015 |
| DE | 10 2014 114 019 A1 | 3/2016 |
| DE | 10 2015 220 601 A1 | 4/2017 |
| EP | 2 077 592 A1 | 7/2009 |
| WO | WO-2018206896 A1 * | 11/2018 .......... H01M 50/249 |

OTHER PUBLICATIONS

German-language Written Opinion (PCT/ISA/237) issued in PCT Application No. PCT/EP2021/051563 dated May 20, 2021 (five (5) pages).

German Search Report issued in German Application No. 10 2020 104 501.8 dated Oct. 20, 2020 with partial English translation (seven (7) pages).

* cited by examiner

AIR DISPLACER, TRACTION BATTERY, PRODUCTION METHOD AND MOTOR VEHICLE

BACKGROUND AND SUMMARY OF THE INVENTION

The invention relates to an air displacer for a traction battery of a motor vehicle. The invention also relates to a traction battery, to a method for producing a traction battery and to a motor vehicle.

In the present case, interest is directed to traction batteries for electrically drivable motor vehicles. Such traction batteries usually have a battery housing, in which multiple interconnected battery modules, battery cells or electrically or geometrically linked cell packs are arranged. It is in this case usual when arranging the battery modules in the battery housing to maintain predetermined distances between the battery modules and housing walls of the battery housing, which serve for example as buffer zones in the case of the battery housing being exposed to forces caused by an accident. These distances may be the result of structural design, technical assembly, electrical, electromagnetic or other requirements. These distances however form a free, air-filled volume, wherein the air can undesirably promote heat generation or a fire in the battery housing in the event of a fault, for example in the case of a thermal event of a battery cell of the battery module, by providing the oxygen contained in it.

In order to prevent a fire, it is known for example from DE 10 2015 220 601 A1 to provide a device for introducing a cooling or extinguishing agent for a battery of a motor vehicle. The device has a connection element, which can be fluidically connected to a cooling or extinguishing agent store, and a line, which can be fluidically connected to the connection element and can be led to the battery. The extinguishing agent may be for example an extinguishing foam, which can stifle a fire of the battery. However, such a device has a high installation space requirement in the motor vehicle.

The object of the present invention is to provide an alternative solution for how overheating of a traction battery of a motor vehicle can be prevented in a way that is easy and saves installation space.

This object is achieved according to an air displacer, a traction battery, a method for producing a traction battery and a motor vehicle according to the claimed invention.

An air displacer according to an embodiment of the invention for a traction battery of a motor vehicle is designed such that, in an installed state in a battery housing of the traction battery, it is intended to at least partially fill a free volume in the battery housing and thereby at least partially displace air in the battery housing in the event of heat generation inside the housing. The air displacer has a vacuum bag, a foam, which can be expanded by air and is arranged in the vacuum bag, and a manually openable air inlet point, by way of which the vacuum bag can be evacuated and can be flooded with air. The air displacer can be transferred from an initial state, in which the vacuum bag is at least partially evacuated in the closed state of the air inlet point and the foam located in the vacuum bag is in a compressed state, into an end state, which is intended for the installed state and in which the vacuum bag is flooded with air by manual opening of the air inlet point and as a result the foam is in an expanded state.

The invention also relates to a traction battery for a motor vehicle with a battery housing, multiple components, which are arranged in the battery housing, and at least one air displacer according to an embodiment of the invention, wherein the air displacer is arranged in a free volume, not required by the components, in the battery housing and is thereby in the end state. The components may for example be formed as battery modules, which in each case have an interconnection of multiple battery cells.

In a method according to an embodiment of the invention for producing a traction battery according to the invention, the air displacer is provided in the initial state before or after delivery to an installation location of the traction battery. The components are arranged in the battery housing. The air displacer is introduced into or installed in the battery housing. Before and after installation of the air displacer in the battery housing, the air inlet point is manually opened, in order to provide the end state of the air displacer by flooding of the vacuum bag to expand the foam, wherein the air displacer in the end state and in the installed state at least partially fills a free volume in the battery housing.

The air displacer is of a self-inflating form. The initial state of the air displacer is in particular a pre-assembly state, in which the air displacer is for example stored in a space-saving manner and transported for installation in the battery housing of the traction battery. In this initial state, the air displacer has a first packing size. The end state of the air displacer is a final assembly state, which the air displacer is in for example shortly before installation in the battery housing or at the latest after installation in the battery housing and which is actively brought about, for example by an assembly operative. In this end state, the air displacer has a second packing size, which is larger in comparison with the first packing size. In the end state, the air displacer may have a geometry which is adapted to a form of the free volume in the battery housing. The form of the free volume is in this case defined by inter-spaces or free spaces between the components and between the components and housing walls of the battery housing.

The air displacer has the vacuum bag. The vacuum bag is in particular a flexible, airtight envelope, in which the foam is arranged. The vacuum bag may for example be formed from a plastic sheet or metal foil. The foam which is located in an interior space of the vacuum bag may be expanded by supplying air or supplying oxygen. In the at least partially evacuated state of the vacuum bag, as little air as possible is in the vacuum bag, and so the foam is in the compressed, unexpanded state. With the air inlet point closed, the foam remains in the compressed state within the vacuum bag. For example, the foam may be pre-compressed and laminated into the vacuum bag, whereby it remains compressed under the free atmosphere so as to produce the first packing size. As an alternative to this, the expanded foam may be inserted into the vacuum bag. After that, the vacuum bag may be evacuated or have the air sucked out, whereby the air displacer is compressed to the first packing size.

Before or after the arranging of the air displacer in the free volume, unoccupied by the components, of the battery housing, the air inlet point is opened manually, for example by the assembly operative, in order to be able to let air from the surroundings into the interior space of the vacuum bag. Manual opening should be understood here as meaning that the letting of the air into the vacuum bag is actively initiated, for example by the assembly operative. The air sucked into the vacuum bag allows the foam to expand, until the air displacer has been expanded to the end state and consequently has the second packing size. If the air displacer is arranged in the region between the housing walls of the battery housing and the components, the foam is preferably a very soft, large-pored foam, so that in the case of the battery housing being exposed to forces caused by an accident it can give way or yield and not exert any harmful pressure on the components. For example, the foam may be a polyurethane foam. The vacuum bag may be formed by multiple, linked vacuum chambers, which can in particular be flooded with air by way of the same air inlet point. In this way, the flexible geometry of the air displacer in the end state can be provided.

Such an air displacer has the advantage that it has a particularly small packing size before assembly and is easy to handle. Moreover, the air displacer has few, inexpensive components.

The vacuum bag is preferably formed from a heat-resistant material to prevent air from being released from the vacuum bag in the case of heat generation. It is thus intended to prevent the vacuum bag from melting and the air located in this foam from being released again. It is also advantageous if the foam is formed by a nonflammable or only poorly flammable material. The foam may also be fully or partially skinned, so that in the case of melting of the vacuum bag as little oxygen as possible escapes from the foam and contributes to heat generation.

Particularly preferably, the air inlet point is formed as a manually activatable valve. In particular, the valve has a valve body and a valve seat arranged on the vacuum bag, wherein the valve body and the valve seat are connected by way of a bayonet closure. The valve is in this case designed in such a way that, although air can be sucked into the vacuum bag in the open state of the valve, it cannot escape again, or only scarcely. For this purpose, the valve may for example be formed such that it can close again after opening, in order to prevent air from diffusing out. A valve formed with a bayonet closure, that is to say a twist-and-insert closure, is also particularly easy to handle.

As an alternative to this, the air inlet point may also be formed as a region of the vacuum bag which is actively damaged by the assembly operative. For example, the vacuum bag may be torn or pierced in this region, for example with a tool. The air inlet point may also be opened by way of a predetermined breaking point on the vacuum bag. Such a predetermined breaking point may be for example a perforated region of the vacuum bag at which the vacuum bag is designed such that it can be torn open or a part of the vacuum bag can be torn off. In addition, the air inlet point may for example be arranged on a kind of docking station in a transport container for the air displacer, which acts as a closure of the air inlet point. When the air displacer is removed from the transport container, the closure of the air inlet point is removed and the air displacer can inflate.

The invention also relates to a motor vehicle with a traction battery according to an embodiment of the invention. The motor vehicle is formed as an electrically drivable motor vehicle.

The embodiments presented with respect to the air displacer according to an embodiment of the invention and their advantages apply correspondingly to the traction battery according to an embodiment of the invention, to the method according to an embodiment of the invention and to the motor vehicle according to an embodiment of the invention.

Further features of the invention emerge from the claims, the figures and the description of the figures. The features and combinations of features mentioned above in the description and the features and combinations of features mentioned in the description of the figures below and/or shown in the figures alone can be used not only in the respectively stated combination but also in other combinations or alone.

The invention is now explained in more detail on the basis of an exemplary embodiment and also with reference to the drawings.

DETAILED DESCRIPTION OF THE DRAWINGS

In the figures, elements that are the same or functionally the same are provided with the same designations.

Figure 1:
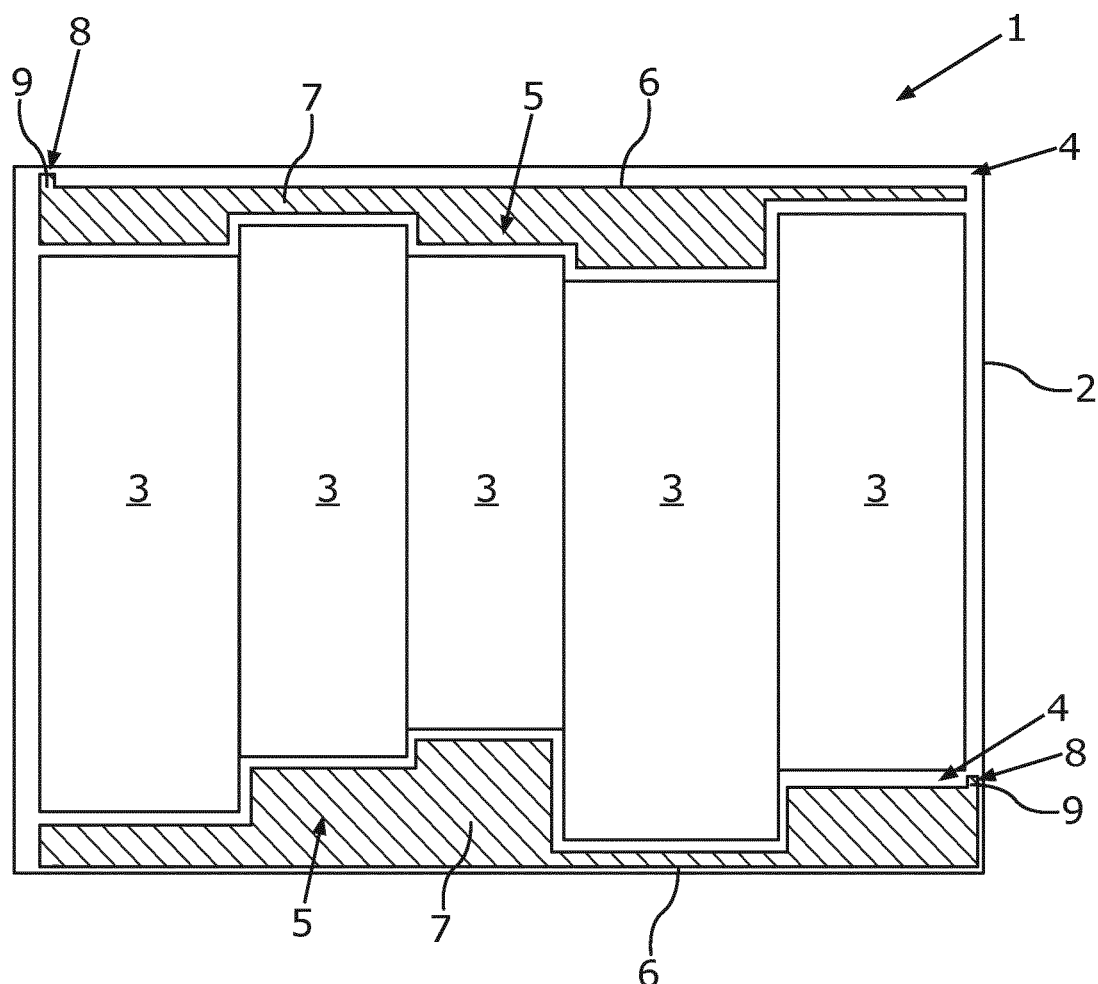
FIG. 1 shows a schematic representation of an embodiment of a traction battery of a motor vehicle.
Figure 2:
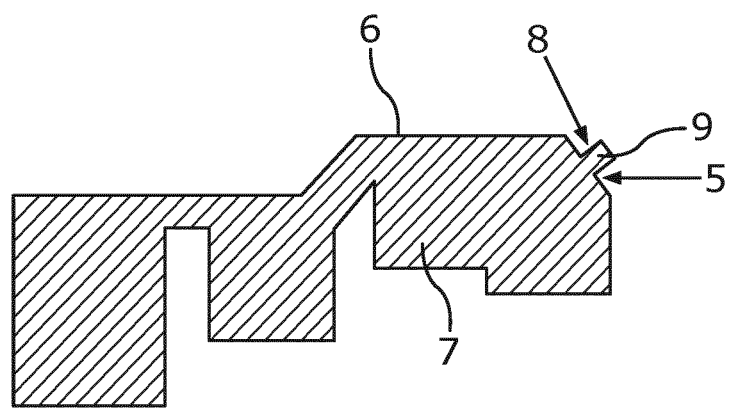
FIG. 2 shows a schematic representation of an embodiment of an air displacer for the traction battery.

FIG. 1 shows a traction battery 1 for an electrically drivable motor vehicle. The traction battery 1 has a battery housing 2, in which multiple components 3, for example battery modules, are arranged. In order to fill a free volume 4, which is defined by free spaces between the components 3 and between the components 3 and the battery housing 2, and thereby be able to displace air located in the volume 4, the traction battery 1 has an air displacer 5, which is also shown in FIG. 2. The air displacer 5 has a vacuum bag 6 and a foam 7, which is arranged in the vacuum bag 6. In FIG. 2, the air displacer 5 is shown in an end state, in which an interior space of the vacuum bag 6 is filled with air and as a result the foam is expanded. The air displacer 5 may also be in an initial state, in which the interior space of the vacuum bag 6 is at least partially evacuated and the foam 7 is thereby compressed. Since the air displacer 5 has a smaller packing size in the initial state than in the end state, it can be stored and transported in a particularly space-saving manner.

The air displacer 5 assumes the end state in the installed state in the battery housing 4. In the end state or inflated state, the air displacer 5 may have any desired geometry, in order to be able to fill the free volume 4 in the battery housing 2 as completely as possible. In order to be able to transfer the air displacer 5 from the initial state into the end state, the vacuum bag 6 has an air inlet point 8, by way of which the interior space of the vacuum bag 6 can be flooded with air. The air inlet point 8 is designed in such a way that it can be opened manually, for example by an assembly operative. For example, the air inlet point 8 may be opened by deliberately destroying a region of the vacuum bag 6. As an alternative to this, the air inlet point 8 is formed as a valve 9, which can be manually opened. For example, the valve 9 may have a bayonet closure. By way of the manually opened valve 9, air can flow into the vacuum bag 6, and so the air displacer 5 can inflate. The air displacer 5 is in particular designed such that in the inflated state no air or only little air can leave the interior space of the vacuum bag 6, in order not to supply oxygen to a fire developing in the battery housing 2. For this purpose, the vacuum bag 6, the valve 9 and the foam 7 are in particular formed from fire-resistant materials.

The invention claimed is:

1. An air displacer for a traction battery of a motor vehicle, the air displacer comprising:
   a vacuum bag,
   a foam, which is expandable by air and is arranged in the vacuum bag, and
   a manually openable air inlet point, by way of which the vacuum bag is at least partially evacuatable and is floodable with air, wherein the air displacer is transferrable from an initial state in which the vacuum bag is evacuated in a closed state of the air inlet point and the foam located in the vacuum bag is compressed, into an end state which is intended for the installed state and in which the vacuum bag is flooded with air by manual opening of the air inlet point and as a result the foam is expanded, wherein:

the air displacer is configured such that, in an installed state in a battery housing of the traction battery, the air displacer is intended to at least partially fill a free volume in the battery housing and thereby at least partially displace air in the battery housing in an event of heat generation inside the battery housing, the air inlet point is formed as a manually activatable valve, and the valve has a valve body and a valve seat arranged on the vacuum bag, and the valve body and the valve seat are connected by way of a bayonet closure.

2. The air displacer according to claim 1, wherein:
the vacuum bag is formed from a plastic sheet.

3. The air displacer according to claim 1, wherein:
the vacuum bag is formed from a heat-resistant material to prevent air from being released from the vacuum bag in a case of heat generation.

4. The air displacer according to claim 1, wherein:
the foam is formed as at least partially skinned to prevent air from escaping in an expanded state of the foam.

5. A traction battery for a motor vehicle, the traction battery comprising:
a battery housing,
multiple components which are arranged in the battery housing, and
at least one air displacer according to claim 1,
wherein the air displacer is arranged in a free volume, not required by the components, in the battery housing and is thereby in the end state.

6. A method for producing the traction battery according to claim 5, the method comprising:
providing the air displacer in the initial state,
arranging the components in the battery housing,
introducing the air displacer into the battery housing,
before or after introducing the air displacer, manually opening the air inlet point to provide the final state of the air displacer by flooding the vacuum bag with air to expand the foam, wherein the air displacer in the end state and in the installed state at least partially fills the free volume in the battery housing.

7. A motor vehicle comprising the traction battery according to claim 5.

* * * * *